(12) United States Patent
Ulke et al.

(10) Patent No.: US 10,929,395 B2
(45) Date of Patent: Feb. 23, 2021

(54) DATA MODIFICATION IN HYPOTHETICAL PLANNING

(71) Applicants: Markus Ulke, Walldorf (DE); Bernhard Jaecksch, Walldorf (DE); Franz Faerber, Walldorf (DE)

(72) Inventors: Markus Ulke, Walldorf (DE); Bernhard Jaecksch, Walldorf (DE); Franz Faerber, Walldorf (DE)

(73) Assignee: SAP SE, Walldorf (DE)

(*) Notice: Subject to any disclaimer, the term of this patent is extended or adjusted under 35 U.S.C. 154(b) by 751 days.

(21) Appl. No.: 14/568,946

(22) Filed: Dec. 12, 2014

(65) Prior Publication Data

US 2016/0048559 A1 Feb. 18, 2016

Related U.S. Application Data (60) Provisional application No. 62/038,792, filed on Aug. 18, 2014.

(51) Int. Cl.
*G06F 16/2453* (2019.01)
*G06F 16/2455* (2019.01)

(52) U.S. Cl.
CPC .. *G06F 16/24537* (2019.01); *G06F 16/24556* (2019.01)

(58) Field of Classification Search
CPC ......... G06F 17/30489; G06F 17/30454; G06F 16/2282; G06F 16/2455; G06F 16/2453; G06F 16/27; G06F 16/221; G06F 16/24532; G06F 16/24542; G06F 16/2393; G06F 16/283; G06F 16/24544; G06F 16/2456; G06F 16/23; G06F 16/2365

See application file for complete search history.

(56) References Cited

U.S. PATENT DOCUMENTS

| | | | |
|---|---|---|---|
| 8,126,870 B2* | 2/2012 | Chowdhuri | G06F 16/24532 707/713 |
| 8,782,017 B2* | 7/2014 | Das | G06F 16/86 707/693 |
| 9,171,020 B2* | 10/2015 | Faerber | G06F 17/30315 |
| 9,514,166 B2* | 12/2016 | Meinecke | G06F 17/303 |
| 2003/0055814 A1* | 3/2003 | Chen | G06F 17/30454 |
| 2007/0112724 A1* | 5/2007 | Beach | G06F 17/30286 |
| 2009/0100002 A1* | 4/2009 | Nolan | G06F 16/2456 |
| 2013/0290282 A1* | 10/2013 | Faerber | G06F 17/30153 707/693 |

(Continued)

*Primary Examiner* — Angelica Ruiz
(74) *Attorney, Agent, or Firm* — Buckley, Maschoff & Talwalkar LLC (57) ABSTRACT

A system, medium, and method including modifying a graphical view representation of a first table of a set of data, the first table having at least a first column subject to changes in value; modifying a graphical view representation of a second table of a second set of data; determining a query operation of the view representations of the first table and second table; aggregating values of the view representation of the result of the query operation having a same key; determining, based on the aggregated values, values for the first column of the view representation of the first table; and providing an output of the values for the first column of the view representation of the first table, the output values including changed values.

20 Claims, 6 Drawing Sheets

(56) References Cited

U.S. PATENT DOCUMENTS

| | | | | |
|---|---|---|---|---|
| 2014/0122452 A1* | 5/2014 | Faerber | ............ | G06F 17/30315 |
| | | | | 707/693 |
| 2014/0136473 A1* | 5/2014 | Faerber | ............ | G06F 17/30315 |
| | | | | 707/607 |
| 2015/0120698 A1* | 4/2015 | Plattner | ............ | G06F 17/30592 |
| | | | | 707/714 |
| 2016/0042028 A1* | 2/2016 | Faerber | ............ | G06F 17/30153 |
| | | | | 707/607 |
| 2017/0004158 A1* | 1/2017 | Faerber | | |
| 2017/0004177 A1* | 1/2017 | Faerber | | |

* cited by examiner

| StoreId | Location | Costs | Profit | Timestamp |
|---|---|---|---|---|
| XX123 | New York | 1000 | 250 | T19 |
| XX456 | Chicago | 800 | 125 | T22 |
| XX235 | Los Angeles | 1200 | 400 | T15 |
| XX976 | San Francisco | 900 | 300 | T29 |

| StoreId | Location | Costs | Profit | Timestamp |
|---|---|---|---|---|
| XX976 | San Francisco | 900 | 350 | H32 |
| XX756 | Boston | 650 | 100 | H32 |
| XX123 | New York | 1000 | 300 | H32 |

| StoreId | Location | Costs | Profit | Timestamp |
|---|---|---|---|---|
| XX123 | New York | 1000 | 300 | H32 |
| XX456 | Chicago | 800 | 125 | T22 |
| XX235 | Los Angeles | 1200 | 400 | T15 |
| XX976 | San Francisco | 900 | 350 | H32 |
| XX756 | Boston | 650 | 100 | H32 |

ADD A SECOND COLUMN AND A THIRD COLUMN TO A GRAPHICAL VIEW REPRESENTATION OF A FIRST TABLE OF A SET OF DATA, THE FIRST TABLE HAVING A FIRST COLUMN SUBJECT TO CHANGES IN VALUE, VALUES FOR THE SECOND COLUMN BEING INDICATIVE OF A NULL VALUE, AND VALUES FOR THE THIRD COLUMN BEING A FIRST CONSTANT
505

ADD A FIRST COLUMN AND A THIRD COLUMN TO A GRAPHICAL VIEW REPRESENTATION OF A SECOND TABLE OF A SECOND SET OF DATA, THE SECOND TABLE HAVING A SECOND COLUMN, VALUES FOR THE FIRST COLUMN BEING INDICATIVE OF A NULL VALUE, AND VALUES FOR THE THIRD COLUMN BEING A SECOND CONSTANT
510

DETERMINE A UNION ALL QUERY OPERATION OF THE VIEW REPRESENTATIONS OF THE FIRST TABLE AND SECOND TABLE
515

AGGREGATE VALUES OF THE VIEW REPRESENTATION OF THE RESULT OF THE UNION ALL QUERY OPERATION HAVING A SAME KEY
520

DETERMINE, BASED ON THE AGGREGATED VALUES, A VALUE FOR THE FIRST COLUMN OF THE VIEW REPRESENTATION OF THE FIRST TABLE
525

PROVIDE AN OUTPUT OF THE VALUE FOR THE FIRST COLUMN OF THE VIEW REPRESENTATION OF THE FIRST TABLE
525

| StoreId | Location | Costs | L | R | X | Timestamp |
|---|---|---|---|---|---|---|
| XX123 | New York | 1000 | 250 | Null | 1 | T19 |
| XX436 | Chicago | 800 | 125 | Null | 1 | T22 |
| XX235 | Los Angeles | 1200 | 400 | Null | 1 | T15 |
| XX976 | San Francisco | 900 | 300 | Null | 1 | T29 |

| StoreId | Location | Costs | L | R | X | Timestamp |
|---|---|---|---|---|---|---|
| XX976 | San Francisco | 900 | Null | 350 | 2 | H32 |
| XX756 | Boston | 650 | Null | 100 | 2 | H32 |
| XX123 | New York | 1000 | Null | 300 | 2 | H32 |

| StoreId | Location | Costs | L | R | X | Timestamp |
|---|---|---|---|---|---|---|
| XX123 | New York | 1000 | 250 | Null | 1 | T19 |
| XX436 | Chicago | 800 | 125 | Null | 1 | T22 |
| XX235 | Los Angeles | 1200 | 400 | Null | 1 | T15 |
| XX976 | San Francisco | 900 | 300 | Null | 1 | T29 |
| XX976 | San Francisco | 900 | Null | 350 | 2 | H32 |
| XX756 | Boston | 650 | Null | 100 | 2 | H32 |
| XX123 | New York | 1000 | Null | 300 | 2 | H32 |

| StoreId | Location | Costs | L (905) | R (910) | X (915) | Timestamp |
|---|---|---|---|---|---|---|
| XX123 | New York | 1000 | 250 | 300 | 5 | H32 |
| XX456 | Chicago | 800 | 125 | Null | 1 | T22 |
| XX235 | Los Angeles | 1200 | 400 | Null | 5 | T15 |
| XX976 | San Francisco | 900 | 350 | 350 | 5 | H32 |
| XX756 | Boston | 650 | Null | 100 | 2 | H32 |

| StoreId | Location | Costs | Profit (1005) | Timestamp |
|---|---|---|---|---|
| XX123 | New York | 1000 | 300 | H32 |
| XX456 | Chicago | 800 | 125 | T22 |
| XX235 | Los Angeles | 1200 | 400 | T15 |
| XX976 | San Francisco | 900 | 350 | H32 |
| XX756 | Boston | 650 | 100 | H32 |

DATA MODIFICATION IN HYPOTHETICAL PLANNING

BACKGROUND

Hypothetical analysis is used in a range of business areas and business functions. For example, enterprises planning future actions may want to take advantage of certain data science capabilities to try to determine what actions could benefit them the most. Data Science functionalities might include mining results of past actions, learning likely correlations, predicting trends and simulating effects of the hypothetical actions. These functionalities could help suggest both reasonable business strategies and evaluate the effects of pursuing those strategies. Such evaluation is quite difficult in complex environments where competitors, customers and economies dynamically evolve.

DETAILED DESCRIPTION

Figure 1:
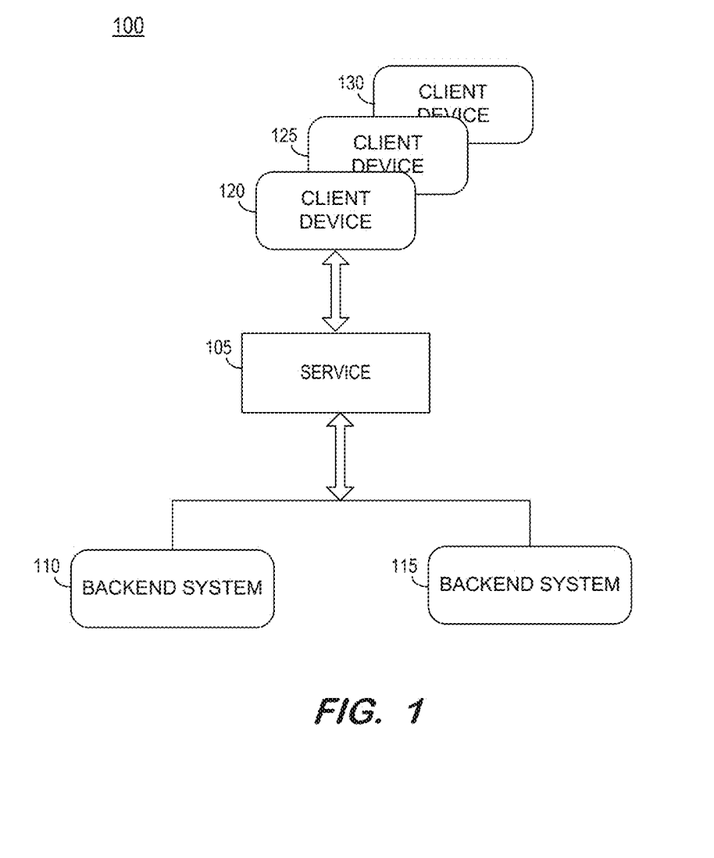
FIG. 1 is a schematic block diagram of a system, according to some embodiments.

FIG. 1 is a block diagram of a system 100, according to some embodiments herein. System 100 represents a logical architecture for describing a system, apparatus, and processes for a hypothetical planning and other contexts where hypothetical change(s) to data and the effects of those changes may be calculated and visualized, while limiting the impact of those changes to the existing data. Actual implementations of system 100 may include more or different components arranged in other manners than that shown in FIG. 1.

System 100 includes a service 105 that may be developed and delivered to one or more entities such as, for example, client devices 120, 125, and 130. In some aspects, service 105 may be a cloud-based service provided by a service provider thereof. Service 105 may be supported and facilitated by one or more backend systems 110 and 115. Backend systems 110 and 115 may include hardware, software, and combinations thereof configured to deliver and make service 105 available to client devices 120, 125, and 130. Backend systems 110 and 115 may include, alone and/or in combination, processors, different types of memory, software applications and operating systems, communication devices, and interface mechanisms to facilitate communication between the different components and a framework or platform to deliver service 105.

Service 105 may comprise an application server, an enterprise application, a messaging service (e.g., a mail service), a social networking service, a data center to provide resources from data sources (not shown), and other systems, devices, components, and resources. In some aspects, service 105 may include an enterprise application used for conducting enterprise planning and analysis. Some such enterprise applications may include, for example, Enterprise Performance Management, Financial Planning, Sales and Opportunity Planning, and Business Warehouse Planning applications provided by the assignee hereof, SAP SE. These, and other, planning applications may be used for decision support and report generation transactions, as well as for warehouse analysis.

In some instances, service 105 may include a cloud based application, system, service, or resource that provides a service, resource, and/or access to a service or resource to client devices 120, 125, and 130. Service 105 may be delivered by a service provider remotely located from client devices 120, 120, 125, and 130. Communication between the client devices, service provider, and the backend systems may be accomplished using any communication protocol known and that becomes known.

In some aspects, an enterprise application and/or an administrator, user, or other entity may have a desire to analyze one or more "what if" results in parallel to an on-going operation of a data management system. In some regards, it may be desirable to analyze the different "what if" scenarios for one or more different hypothetical actions while also allowing other applications and processes to concurrently perform actual updates and other operations on the underlying data in a manner such that the hypothetical (i.e., "what if") operations do not interfere with each other or with actual updates and other changes to the data.

Some database systems offer a form of snapshot isolation capabilities so that transactions can operate on data as the data existed as of particular (logical) times, usually when each transaction or a statement within a transaction started. With a basic form of snapshot isolation, changes of the same data by different transactions would interfere with each other, even if those changes were hypothetical modifications in transactions that support analysis but would never be committed.

In some embodiments, a "Calc View" approach for performing hypothetical data changes is disclosed herein. The disclosed approach uses an innovative and efficient computation process to combine a table snapshot with hypothetical modifications to obtain a hypothetical view of data. In some aspects, the disclosed process provides a mechanism for optimization of any query referencing one or more hypothetical views that can be performed without materializing the hypothetical views. The "Calc View" approach disclosed herein may be feasible for SQL systems providing snapshot isolation and other isolation levels (notwithstanding different semantics) such as Read Consistency.

Figure 2:
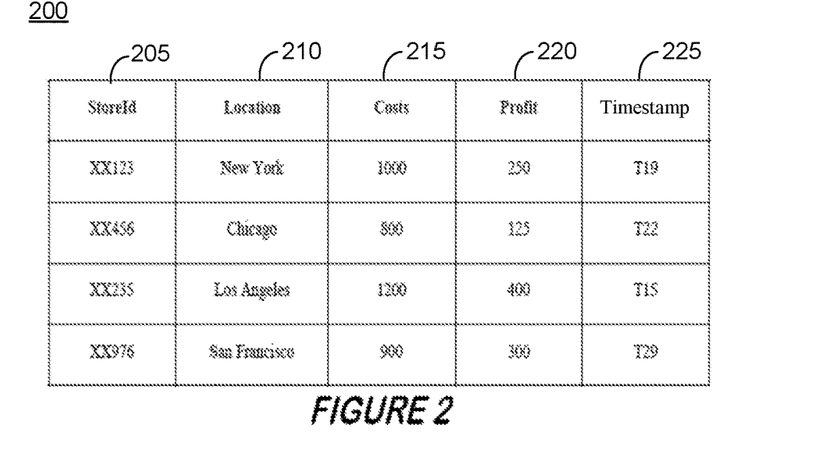
FIG. 2 is an illustrative depiction of a table, according to some embodiments.

FIG. 2 is an illustrative example of a table (T), generally referenced at numeral 200, including a collection or set of data. In this example, the table T (200) has a key StoreId 205. Other columns of table T represent a given store's Location 210, Costs 215, and Profit 220. Also listed in table T of FIG. 1 is a hidden internal Timestamp indicating when that data was committed to a database housing the data. Data for a row of table T is current as of the listed Timestamp, but when data for that row is updated by a subsequent transaction that commits, a new entry for that row with a later Timestamp will be generated and that data will then be current. Implementations of database tables may often include a RowId, but for simplicity of this example the rows will be distinguished based on an immutable StoreId 205 key. In some aspects, data for tables herein may be stored in row or column format.

FIG. 2 shows an instance of table T with rows that are current as of logical time T29. There may be earlier versions of the rows in the table, but those are not shown in the present example since they will not be visible to transactions begun after the rows in FIG. 2 were committed. Database management systems, including multivariable concurrency control (MVCC) systems, that provide snapshot isolation may handle such visibility consideration(s) transparently.

Figure 3:
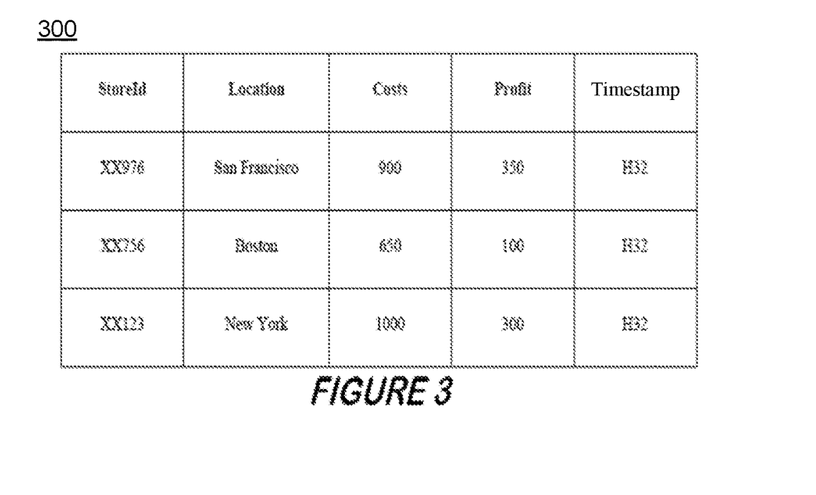
FIG. 3 is an illustrative depiction of a table with hypothetical changes to the table of FIG. 1, in accordance with some embodiments.

Table 300 T' is illustrated in FIG. 3. Table 300 is a hypothetical modification table T' that includes some hypothetical modifications to table T. As seen in table 300, table T' includes two updates (one for the San Francisco store and one the New York store) and one insertion (for the Boston store). In some aspects, the Timestamp field reflects the logical time that a transaction commits. For transactions that are in-flight, the Timestamp field may include a TransactionId (distinguishable from a logical time), which will be replaced by the commit time if the transaction commits. In FIG. 3, H32 has been entered for the Timestamp to emphasize that these changes are part of a hypothetical transaction that began at logical time T32 but has not committed. In some aspects, the data shown in table T 200 of FIG. 2 would be visible to that hypothetical transaction, as would the modifications made by the hypothetical transaction itself.

If there were multiple simultaneous hypothetical transactions, they would have separate Timestamps. In some regards, different hypothetical transactions do not see each other's changes and actual transactions do not see changes made by hypothetical transactions. Modifications to an actual table committed after a hypothetical transactional started would not be visible to the hypothetical transaction. Furthermore, hypothetical transactions herein do not commit and do not hold locks on data, unless specifically noted herein for a particular instance or circumstance.

Figure 4:
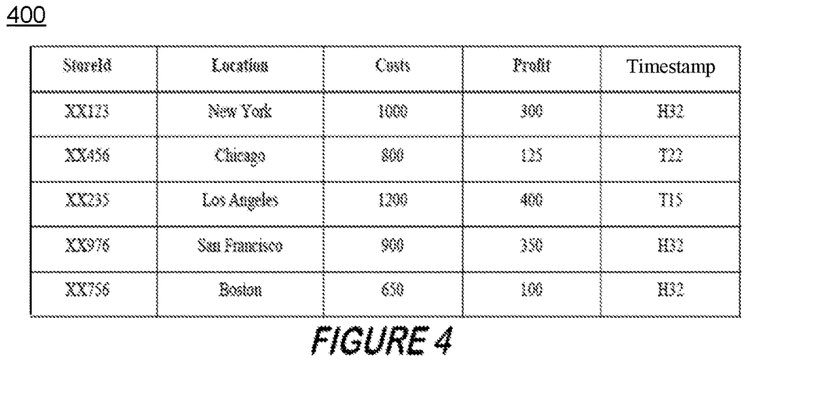
FIG. 4 is an illustrative depiction of a table with the hypothetical changes of the table of FIG. 3 applied thereto, according to some embodiments.

Whereas table T 200 illustrates the data as it existed at the start of a hypothetical modification of that data and table T' 300 illustrates the hypothetical changes to be made to the data of table T, FIG. 4 shows a result table T" 400 visible to the hypothetical transaction when the modification in table T' 300 are applied to table T 200. Herein, this operation is referred to as the OverWrite of T by T'. Referring to table T" 400, it is seen that a row including the Boston store was inserted and information for the New York and San Francisco stores was updated.

For the example of FIGS. 2-4, changes to the listed data only occurred in one column, the column labeled "Profit". However, the overwriting of T by T' operation discussed herein may be expanded and applied to instances where multiple columns (and multiple tables) are hypothetically changed (e.g., insertions, updates, etc.). Further disclosures herein may also be illustrated, for sake of clarity and demonstration of particular processes and techniques, with examples of hypothetical data modifications to a single column of a table, although these further processes and techniques may generally be applicable to and encompass changes to multiple columns and multiple tables.

In some aspects, hypothetical transactions including deletions of data may be handled in a number of different methods. One method to handle deletions is to enter a "tombstone" indicating that a given row has been deleted as of a specific logical time (or during an in-flight transaction). Another method that may be used is to enter null or other default value (e.g., zero) for the non-key columns of a row that is deleted. The latter method may be used in some embodiment herein.

In some embodiments, processes and hypothetical planning techniques disclosed herein may be embodied using "views" of database data. In some embodiments, a "Calculation (Calc) View" is a term used in, for example, SAP HANA to refer to a graph representing a query execution on a collection of data. Calc Views in SAP HANA may be created using graphical tools or using SAP HANA's stored procedure language, SQL Script. In some aspects, a Calc View may refer to parameters. To activate a Calc View for execution, a query on the Calc View is specified, instantiating parameters. With activation, the operations described in the Calc View are simplified, omitting extraneous operations and an optimized plan execution/data flow graph is produced.

While the processes herein may be described in relation to SAP HANA in some embodiments, aspects of the present disclosure may find applicability in other (SQL) databases possibly based on SQL, not requiring Calc Views or other stored procedure capabilities. That is, embodiments of the present disclosure are not limited to SAP HANA, neither specifically nor completely, and may be generically applicable to other database management systems.

In some embodiments related to SAP HANA, the following informal and relatively simplified definition of a Calc View in valid for the present disclosure. In particular, a Calc View may include any of the following:

a table or view;
JOIN of Calc Views, as well as SQL OUTER JOINs;
SELECT/PROJECT on a Calc View with SQL WHERE clauses and AS clauses (for column renaming) including: SELECT DISTINCT on a Calc View; SELECT with SQL Scalar functions on attributes, including conditional expressions and type conversion operations; and SELECT with AGGREGATE functions (which can include key figures/measures and other statistical functions) and with GROUPBY; and
UNION (DISTINCT) or UNION ALL of Calc Views.

In some aspects, SAP HANA's Calc Views may include a number of other capabilities found in stored procedure languages, including procedural constructs with control flow and exception handling constructs, as well as other novel capabilities. While a full extent of the capabilities of the Calc Views referenced herein are not fully discussed in detail, the disclosed Calc Views are not limited to the specific capabilities discussed herein.

The present disclosure will now describe how the results shown in FIG. 4 illustrating the OverWrite of T (FIG. 2, table 200) by the modifications in T' (FIG. 3, table 300) may be efficiently calculated using a "Calc View Approach" that will be discussed in detail hereinbelow. In the following discussion, T' is the hypothetical modification table.

In the following example, it will be assumed that modifications/updates change only a single column, in this case, the column labeled "Profit". In some embodiments, the column subject to change in a view of table T will be referred to as a first or L (Left) column. Similarly, the Profit column in a view of table T' will be referred to herein as a second or R (Right) column. In some embodiments, the following operations in the following process(es), may be done in views, where the views may not need to be materialized.

Figure 5:
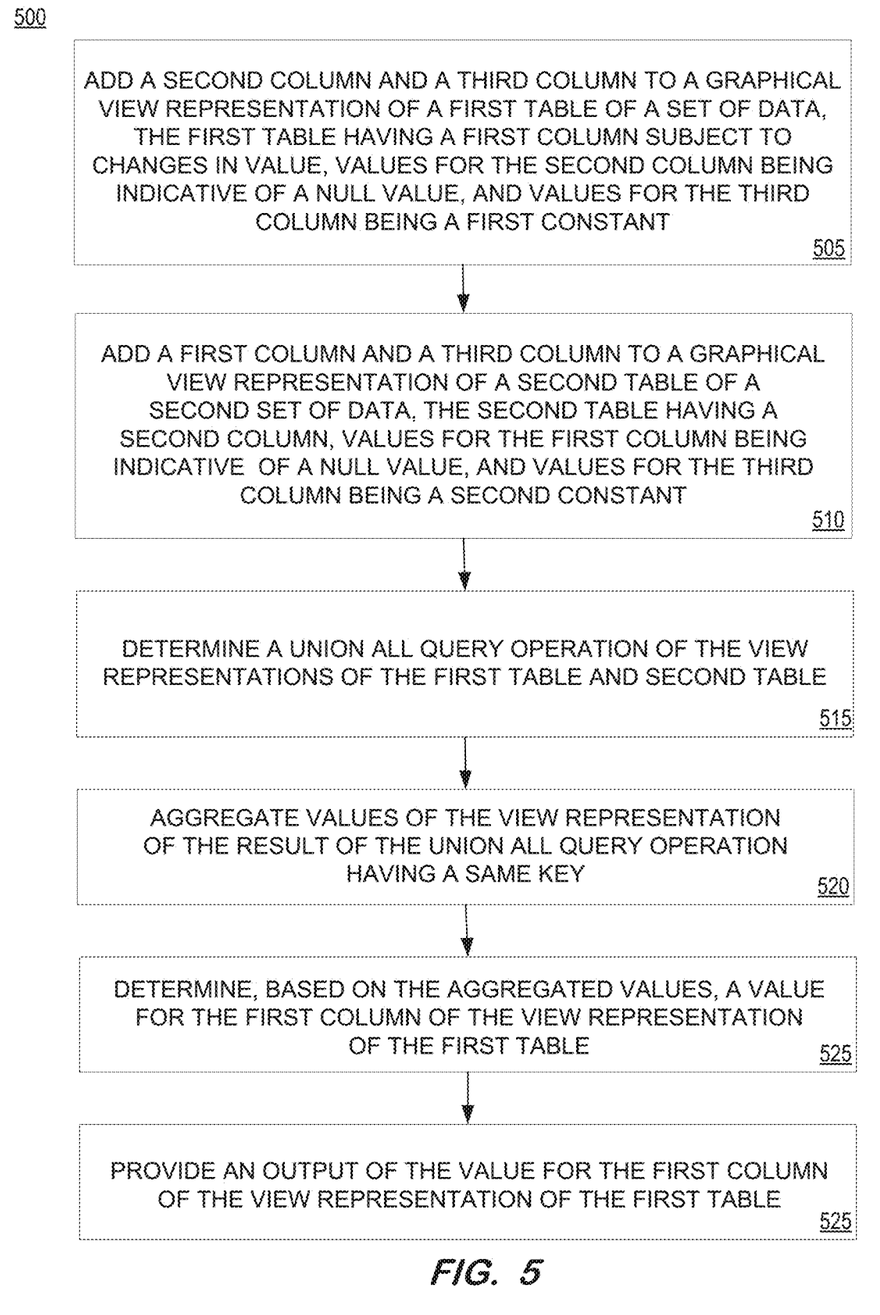
FIG. 5 is a flow diagram of a process, according to some embodiments.

FIG. 5 is an illustrative flow diagram of a process 500, in accordance with some embodiments herein. In some embodiments, various hardware elements of system 100 may execute program instructions to perform process 500. In some embodiments, hard-wired circuitry may be used in place of, or in combination with, program instructions for implementation of processes according to some embodiments. Embodiments are therefore not limited to any specific combination of hardware and software.

In some embodiments, prior to operation 505, tables T and T' including data persisted in a database and views of table T and T' may be generated. Process 500 may operate on the views of table T and T', V(T) and V(T') respectively. At operation 505, a second or (R) column and a third or (X) column are added to T. The values for the second column (R) are indicative of a Null value (e.g., equal to Null). The values for the third column (X) are set to a first constant. In the present example, the value for the first constant has a value of 1. The result of operation 505 is referred to as V(T) and is illustrated in view 600 shown in FIG. 6.

At operation 510, a first or (L) column and a third or (X) column are added to T'. The values for the first column (L) are indicative of a Null value (e.g., equal to Null) and the values for the third column (X) are set to a second constant. In the present example, the value for the second constant has a value of 2. The result of operation 510 is referred to as V(T') and is illustrated in view 700 shown in FIG. 7. The value of the Timestamp is depicted as H32, in reference of to a logical time of 32 for the hypothetical scenario of represented by T', which has not committed.

Figure 6:
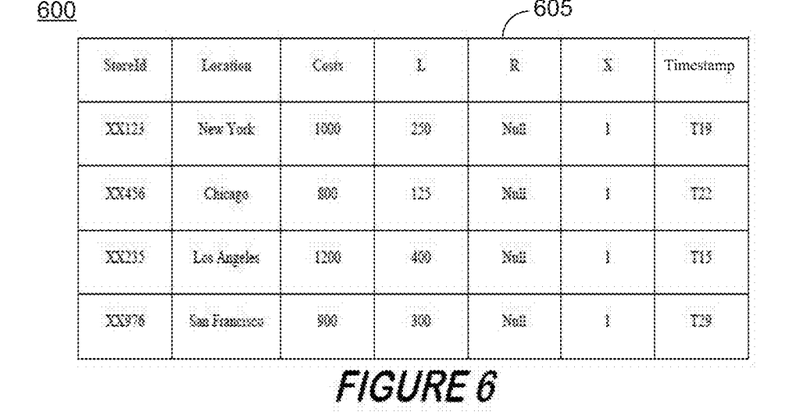
FIG. 6 is an illustrative depiction of a table, in accordance with some embodiments.
Figure 7:
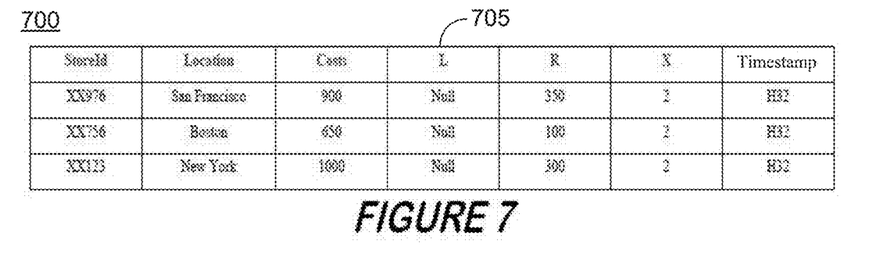
FIG. 7 is an illustrative depiction of a table, according to some embodiments.

Referring to both FIGS. 6 and 7, it is noted that V(T) and V(T') have identical schemas. The commonality of schemas for V(T) and V(T') facilitates the execution or queries and other operations on V(T) and V(T'). In some aspects, operations 505 and 510 may generally be referred to as modifications of the views of V(T) and V(T').

At operation 515, a determination or calculation of a UNION ALL operation of the views V(T) and V(T') is performed. That is, a computation of V(T) UNION ALL V(T') is determined. The result of the V(T) UNION ALL V(T') calculation of operation 515 is shown in view 800 of FIG. 8. As shown by the result view of FIG. 8, the UNION ALL operation herein executes in accordance and consistent with an SQL UNION ALL command.

Figure 8:
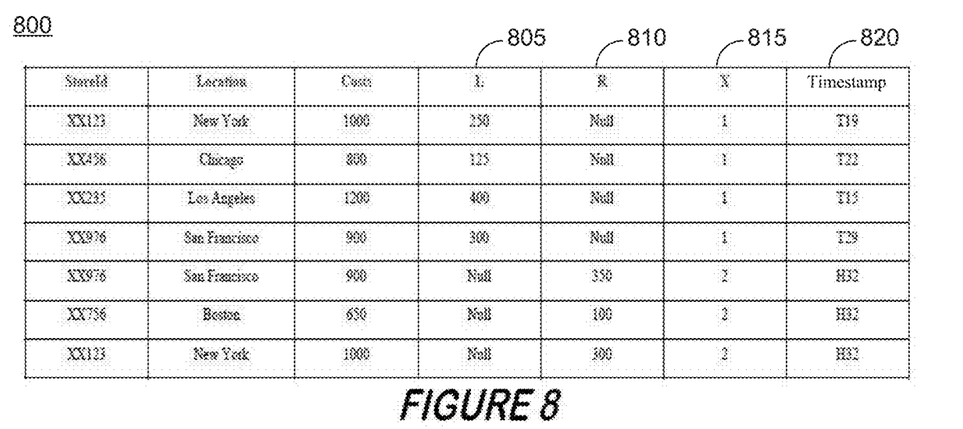
FIG. 8 is an illustrative depiction of a table, according to some embodiments.

At operation 520 of process 500, values of the resultant view 800 from operation 515 are grouped together. In particular, values with the same key in view 800 are aggregated. In some embodiments, the aggregation proceeds as follows. For the first (L) column 805, a COALESCE or similar function that takes the first non-null value may be used. The first non-null value will be the value from V(T) since (L) will always be Null in V(T) (e.g., FIG. 7, column 705). For the second (R) column 810, a COALESCE or similar function may be used that takes the first non-null value, which will be the value from V(T') since the value for (R) is always Null in V(T) (e.g., FIG. 6, column 605). For the third (X) column 815, a SUM function may be used to group the values for the third (X) column 815. Here, (X) will be 1 if a row in V(T) was not updated, (X) will be 2 if the row was not in V(T) but was inserted into V(T'), and (X) will be 3 if the row was in V(T) and was updated in V(T'). For the Timestamp column 820, the maximum value is used since some embodiments herein assume an ordering where hypothetical Timestamps are greater than actual Timestamps, as illustrated by a comparison of the Timestamp values in views V(T) 600 and V(T') 700. The explanation of Timestamp is for exposition of one possible embodiment; Timestamp visibility could be handled as part of the internal implementation in the database system with this data visibility effect, not as a standard SQL operation.

In some embodiments, the values for the other columns (e.g., Location and Costs) from view 800 remain the same. Accordingly, any function that selects one of the columns (e.g., COALESCE) would be acceptable. A result of operation 520 is shown in view 900 of FIG. 9. View 900 includes a first (L) column 905, a second (R) column 910, and a third (X) column 915, where the values shown are calculated in accordance with the aggregating operations described above.

Figure 9:
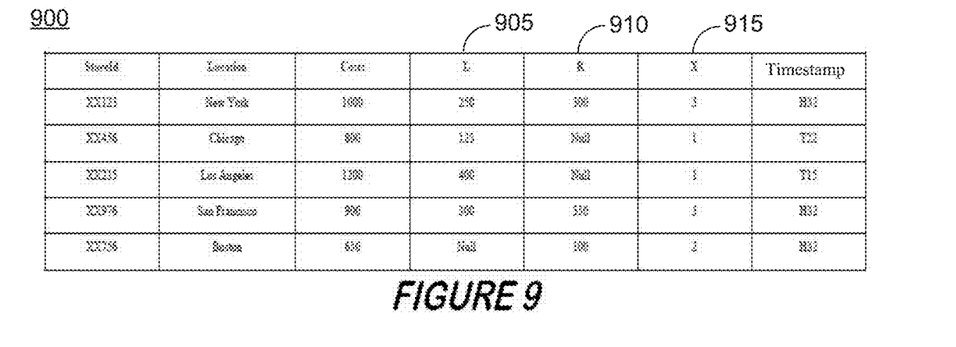
FIG. 9 is an illustrative depiction of a table, according to some embodiments.
Figure 10:
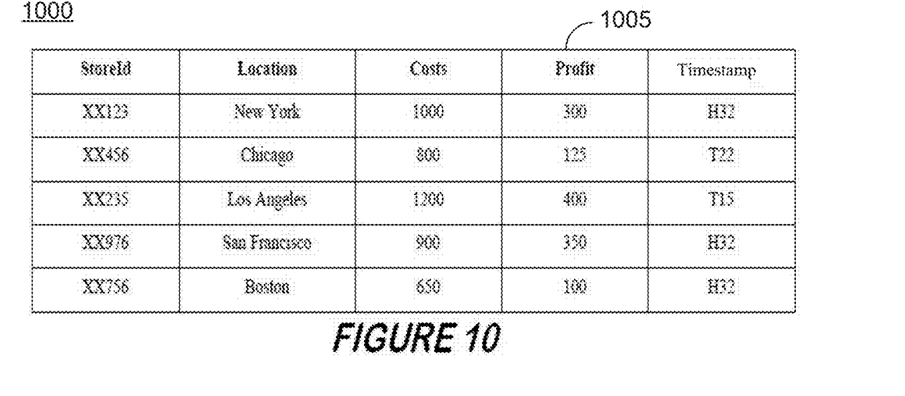
FIG. 10 is an illustrative depiction of a table, according to some embodiments.

Referring to process 500, operation 525 includes determining, based on the aggregated values of view 900, a final result value for the first (L) column. In some embodiments, the aggregated values for the first (L) column are calculated using a logical expression of IF X=1 THEN L ELSE R. As initially discussed with regard to view V(T), the first column 605 of FIG. 6 is the "Profit" column that is renamed (L). A view 1000 including the results of operation 525 are illustrated in FIG. 10, where the column (L) is renamed "Profit" at 1005. View 1000 shown in FIG. 10 shows the addition of a new column, "Profit", and the columns (L), (R) and (X) are omitted to yield the final resultant view 1000. If constants for X values other than 1 and 2 (for example, 0 and 1) were used, then the logical expression for Profit would be different (for example, IF X=0 THEN L ELSE R).

In some embodiments, the logical expression of "IF X=1 THEN L ELSE R" may be defined or represented by another statement(s). For example, alternate statement(s) may be used to return the maximum value from T or T'.

FIG. 10 is identical to FIG. 4, the OverWrite of T by the modifications in T'. This identical result is obtained because X is 1 (i.e., a first constant) for a row if there is no corresponding row (with the same key) in T', and is not 1 if there is an OverWrite of the row in T'. It is noted that (X) is equal to 2 (i.e., a second constant) if a row was inserted (e.g., the Boston row) and will be 3 if the row was updated (e.g., see the New York and San Francisco rows). In some embodiments, different values may be used for the first and second constants and different logical expressions may accordingly be used to obtain the desired result(s) for the operations of process 500 using the corresponding values for the first and second constants.

Process 500 defines a desired OverWrite (operation 525, the results of which are illustrated in FIG. 10), including the generating of the hypothetical table not as a table but as a view. Being a view, there is no need to calculate any values until a hypothetical transaction executes a query on its hypothetical version of the table. For example, if a transaction wants to identify costs and profits for the New York store, that Location predicate could be pushed into the Calc View. Similarly a join, aggregation, and for example an OLAP query involving a hypothetical fact table could optimize execution on the hypothetical table (e.g., by pushing predicates on Dimension Tables into the computation for a hypothetical Fact Table). Accordingly, memory is needed to store modifications T' and any intermediate results of a hypothetical query, but not to store the (potentially large) full OverWrite.

In some aspects, the "Calc View approach" disclosed herein does not require database locking for hypothetical transactions if they do not commit. Additionally, there is no concurrency interference among hypothetical transactions of the process(es) disclosed herein or between the hypothetical transactions and actual transactions.

In some aspects, with tooling supporting, for example, Hypothetical Planning, programming hypothetical transactions as disclosed herein may be efficiently implemented. The hypothetical transactions may be labeled as hypothetical when they are begun and various Select statements may be used to address the desired (T OverWrite T') process.

In some aspects, hypothetical Inserts may be handled by checking the existence of rows in (T OverWrite T') and inserting rows into T' if they do not already exist. Hypothetical Updates may be handled by determining which rows in (T OverWrite T') would be modified and upserting modifications of those rows into T'. In some regards, hypothetical deletes may be accommodated by entering nulls or default values (e.g., zero) as a straight-forward approach. However, there may be situations (e.g., counting rows) where deletions should provide full deletion semantics. For example, if a deletion is handled in the example presented above by making Profit null, then eliding of deleted rows from (T OverWrite T') can be addressed by adding an additional operation that selects only rows with non-null Profit.

In some aspects, rolling back a hypothetical transaction may be efficiently handled since only temporary hypothetical modification tables have been modified according to the process(es) disclosed herein.

It is again noted that the example(s) discussed with respect to process 500 includes modifications to a single column (i.e., Profit), but it can easily and validly be generalized to handle modifications to handle changes to multiple columns (e.g., Profit and Costs). In such instances, there would be additional first (L) and additional second (R) columns for the changing "Costs" column in V(T) and V(T'), in addition to the first (L) and (R) columns for the changing "Profit", with both pairs treated just as L and R were above. A single (X) column may be required, no matter how many columns are modified.

The Calc Model OverWrite approach herein may be applied to any number of tables in a single hypothetical transaction, with a separate hypothetical table for each database table modified.

In some embodiments, the disclosed "Calc Model" approach disclosed herein takes advantage of Snapshot Isolation/MVCC design concepts to simplify programming and improve performance.

Figure 11:
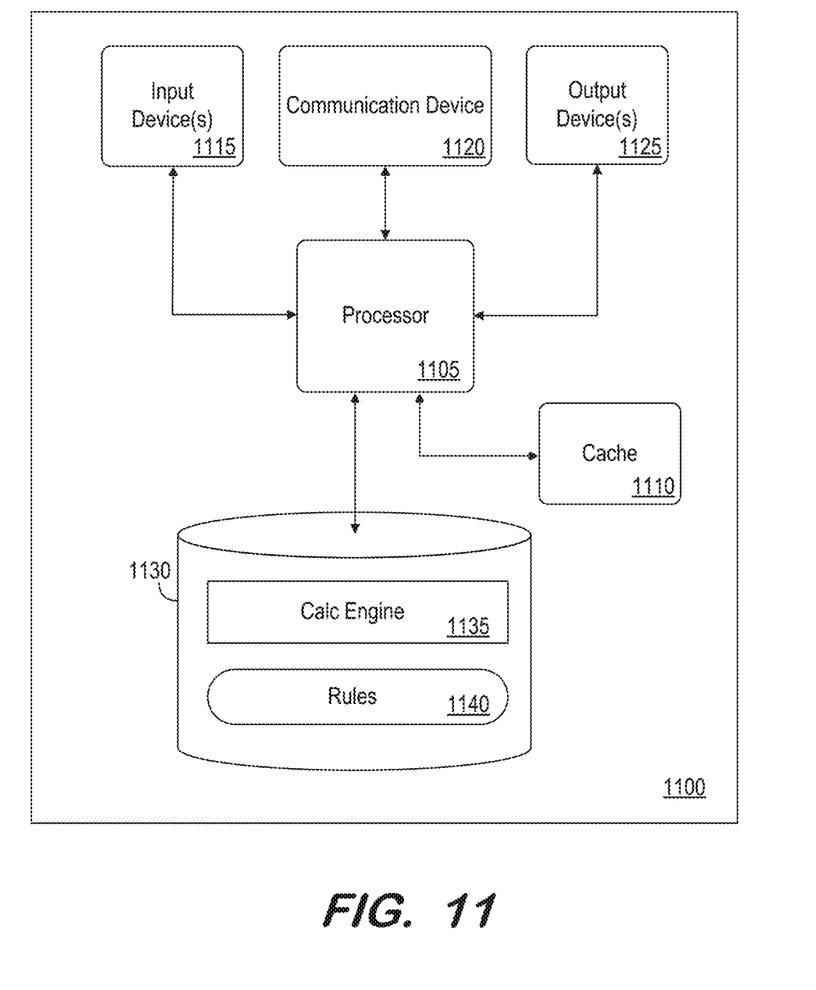
FIG. 11 is an illustrative depiction of an apparatus, according to some embodiments.

FIG. 11 is a block diagram overview of a system or apparatus 1100 according to some embodiments. System 1100 may be, for example, associated with any of the devices described herein, including for example a system or apparatus to support and facilitate hypothetical planning of a service delivered by system 100, in accordance with processes disclosed herein. System 1100 comprises a processor 1105, such as one or more commercially available Central Processing Units (CPUs) in the form of one-chip microprocessors or a multi-core processor, coupled to a communication device 1120 configured to communicate via a communication network (not shown in FIG. 11) to another device or system (e.g., a client device). Some embodiments may operate on data in client devices. In the instance system 1100 comprises a device or system, communication device 1120 may provide a mechanism for system 1100 to interface with a an application, device, system, or service. System 1100 may also include a cache 1110, such as RAM memory modules. The system may further include an input device 1115 (e.g., a touchscreen, mouse and/or keyboard to enter content) and an output device 1125 (e.g., a touchscreen, a computer monitor to display, a LCD display).

Processor 1105 may communicate with a storage device 1130. Storage device 1130 may comprise any appropriate information storage device, including combinations of magnetic storage devices (e.g., a hard disk drive), optical storage devices, solid state drives, and/or semiconductor memory devices. In some embodiments, storage device 1130 may comprise a database system, including in some configurations an in-memory database.

Storage device 1130 may store program code or instructions for a calc engine or other processing capability 1135 that may provide processor executable instructions for hypothetical planning processes, in accordance with processes herein. Processor 1105 may perform the instructions of the calc engine 1135 to thereby operate in accordance with any of the embodiments described herein. The program instructions for calc engine 1135 may be stored in a compressed, uncompiled and/or encrypted format. Program instructions for calc engine 1135 may furthermore include other program elements, such as an operating system, a database management system, and/or device drivers used by the processor 1105 to interface with, other devices and systems (not shown in FIG. 11). Storage device 1130 may also include data 1140 such as rules for determining the disclosed calculations in some embodiments herein. Data 1140 may be used by system 1100, in some aspects, in performing one or more of the processes herein, including individual processes, individual operations of those processes, and combinations of the individual processes and the individual process operations.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

In some aspects and embodiments, additional or alternative extensions of the processes and techniques disclosed herein may be extended to allow hypothetical transactions to persist updates to special tables. Instead of throwing away results, a hypothetical transaction may write results to their hypothetical modification tables and perhaps to other special "Hypothetical Analysis" files or tables, supporting comparison and analysis of results across multiple planning exercises and simulations. Modifications to standard tables would be treated as described earlier, with neither locks nor persistence.

In some embodiments, additional or alternative extensions may allow hypothetical transactions to commit changes to standard tables, as well as special tables. If there are no conflicts, this is relatively simple; if there are conflicts, they could be resolved in various ways including, for example, last one wins; when updates are commutative or otherwise composable, compose them together; show conflicts to planner and have planner decide how to resolve them; and roll back the effects of the hypothetical transaction; determine intent of hypothetical transaction, and apply that to current state of the database.

In some embodiments, additional or alternative extensions may allow hypothetical planners to see their proposed changes applied to the current state of the database (always or on request), so that they have a more current view of effects of their plans. Conflicts could be resolved as described for the previous item.

In some embodiments, additional or alternative extensions may allow recursive hypothetical planning, where after initial planning a hypothetical plan might consider hypothetical alternatives, choose the best, and continue planning.

In some embodiments, additional or alternative extensions may generalize hypothetical transactions to hypothetical processes, or other planning scenarios involving multiple transactions. One variation of allows a planner to create alternative worlds (e.g., with different supplies and prices) and play actual transactions against those alternative worlds, observing a subset of the financial consequences in that alternative world.

Although embodiments have been described with respect to cloud-based entities, some embodiments may be associated with other types of entities that need not be cloud-based, either in part or whole, without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   adding a second column and a third column to modify a database view representation of an existing first table of a set of data persisted in a database, the first table having a first column subject to changes in value in the database view representation of the first table, values for the second column being added to the database view representation of the first table being indicative of a null value, and values for the third column being added to the database view representation of the first table being a first constant;
   adding a first column and a third column to modify a database view representation of an existing second table of a second set of data persisted in a database, the second table including changes made to the data of the first table but not committed to a memory persisting the first table and having a second column, values for the first column being added to the database view representation of the second table being indicative of a null value, and values for the third column being added to the database view representation of the second table being a second constant;
   executing a UNION ALL query operation of the modified database view representations of the first table and second table;
   generating a database view representation of the result of the executing the UNION ALL query operation;
   aggregating values having a same key in the database view representation of the result of executing the UNION ALL query operation;
   determining, based on the aggregated values, result values for the first column of the database view representation of the first table; and
   generating an output of the result values for the first column of the database view representation of the first table, the result values being based on the changes made to the data of the first table but not committed to a memory of the database persisting the first table.

2. The method of claim 1, further comprising, wherein the database view representation of the first table comprises a plurality of columns subject to changes in value and the database view representation of the second table comprises a plurality of second columns:
   adding additional second and additional third columns for each of the plurality of columns subject to changes in value to modify the database view representation of the first table, values for the additional second columns of the first table being indicative of a null value, and values for the additional third columns of the first table being a first constant; and
   adding additional first columns and additional third columns to modify the database view representation of the second table, values for the additional first columns of the second table being indicative of a null value, and values for the additional third columns of the second table being a second constant.

3. The method of claim 1, further comprising:
   generating the database view representation of the first table; and
   generating the database view representation of the second table.

4. The method of claim 1, wherein the database view representations of the first table and second table have a same schema.

5. The method of claim 1, wherein the aggregating of values of the database view representation of the result of the UNION ALL query operation comprises:
   determining a first non-null value for the first column of the database view representation of the result of the executing of the UNION ALL query operation;
   determining a first non-null value for the second column of the database view representation of the result of the UNION ALL query operation; and
   determining, for the third column of the database view representation of the result of the UNION ALL query operation, a SUM operation value.

6. The method of claim 5, wherein the result values for the first column of the database view representation of the first table are determined to be one of the determined first non-null value for the first column of the database view representation of the result of the UNION ALL query operation and the determined first non-null value for the second column of the database view representation of the result of the UNION ALL query operation, based on the value of the third column as determined by the SUM operation.

7. The method of claim 1, wherein the first constant and the second constant are different from each other.

8. A non-transitory medium storing processor-executable program instructions, the medium comprising program instructions executable by a computer to:
   add a second column and a third column to modify a database view representation of an existing first table of a set of data persisted in a database, the first table having a first column subject to changes in value in the database view representation of the first table, values for the second column being added to the database view representation of the first table being indicative of a null value, and values for the third column being added to the database view representation of the first table being a first constant;
   add a first column and a third column to modify a database view representation of an existing second table of a second set of data persisted in a database, the second table including changes made to the data of the first table but not committed to a memory persisting the first table and having a second column, values for the first column being added to the view representation of the second table being indicative of a null value, and values for the third column being added to the database view representation of the second table being a second constant;
execute a UNION ALL query operation of the modified database view representations of the first table and second table;
generate a database view representation of the result of the executing the UNION ALL query operation;
aggregate values having a same key in the database view representation of the result of the executed UNION ALL query operation;
determine, based on the aggregated values, result values for the first column of the database view representation of the first table; and
generate an output of the result values for the first column of the database view representation of the first table, the result values being based on the changes made to the data of the first table but not committed to a memory of the database persisting the first table.

9. The non-transitory medium of claim 8, wherein the database view representation of the first table comprises a plurality of columns subject to changes in value and the database view representation of the second table comprises a plurality of second columns, further comprising program instructions executable by a computer to:
add additional second and additional third columns for each of the plurality of columns subject to changes in value to modify the database view representation of the first table, values for the additional second columns of the first table being indicative of a null value, and values for the additional third columns of the first table being a first constant; and
add additional first columns and additional third columns to modify the database view representation of the second table, values for the additional first columns of the second table being indicative of a null value, and values for the additional third columns of the second table being a second constant.

10. The non-transitory medium of claim 8, further comprising program instructions executable by a computer to:
generate the database view representation of the first table; and
generate the database view representation of the second table.

11. The non-transitory medium of claim 8, wherein the database view representations of the first table and second table have a same schema.

12. The non-transitory medium of claim 8, wherein the aggregating of values of the database view representation of the result of the UNION ALL query operation comprises:
determining a first non-null value for the first column of the database view representation of the result of the UNION ALL query operation;
determining a first non-null value for the second column of the database view representation of the result of the executed UNION ALL query operation; and
determining, for the third column of the database view representation of the result of the UNION ALL query operation, a SUM operation value.

13. The non-transitory medium of claim 12, wherein the result values for the first column of the database view representation of the first table are determined to be one of the determined first non-null value for the first column of the database view representation of the result of the UNION ALL query operation and the determined first non-null value for the second column of the database view representation of the result of the UNION ALL query operation, based on the value of the third column as determined by the SUM operation.

14. The non-transitory medium of claim 8, wherein the first constant and the second constant are different from each other.

15. A system comprising:
a computing device comprising:
a memory storing processor-executable program instructions; and
a processor to execute the processor-executable program instructions to cause the computing device to:
add a second column and a third column to modify a database view representation of an existing first table of a set of data persisted in a database, the first table having a first column subject to changes in value in the database view representation of the first table, values for the second column being added to the database view representation of the first table being indicative of a null value, and values for the third column being added to the database view representation of the first table being a first constant;
add a first column and a third column to modify a database view representation of an existing second table of a second set of data persisted in a database, the second table including changes to be made to the data of the first table but not committed to a memory persisting the first table and having a second column, values for the first column being added to the database view representation of the second table being indicative of a null value, and values for the third column being added to the database view representation of the second table being a second constant to a memory of the database persisting the first table;
execute a UNION ALL query operation of the modified database view representations of the first table and second table;
generate a database view representation of the result of the executing the UNION ALL query operation;
aggregate values having a same key in the database view representation of the executed result of the UNION ALL query operation;
determine, based on the aggregated values, result values for the first column of the database view representation of the first table; and
generate an output of the result values for the first column of the database view representation of the first table, the result values being based on the changes made to the data of the first table but not committed to a memory of the database persisting the first table.

16. The system of claim 15, wherein the database view representation of the first table comprises a plurality of columns subject to changes in value and the database view representation of the second table comprises a plurality of second columns, further comprising program instructions executable by a computer to:
add additional second and additional third columns for each of the plurality of columns subject to changes in value to modify the database view representation of the first table, values for the additional second columns of the first table being indicative of a null value, and values for the additional third columns of the first table being a first constant; and
add additional first columns and additional third columns to modify the database view representation of the second table, values for the additional first columns of the second table being indicative of a null value, and values for the additional third columns of the second table being a second constant.

17. The system of claim 15, wherein the computing device is further caused to:
   generate the database view representation of the first table; and
   generate the database view representation of the second table.

18. The system of claim 15, wherein the database view representations of the first table and second table have a same schema.

19. The system of claim 15, wherein the aggregating of values of the database view representation of the result of the UNION ALL query operation comprises:
   determining a first non-null value for the first column of the database view representation of the result of the executing of the UNION ALL query operation;
   determining a first non-null value for the second column of the database view representation of the result of the UNION ALL query operation; and
   determining, for the third column of the database view representation of the result of the UNION ALL query operation, a SUM operation value.

20. The system of claim 19, wherein the result values for the first column of the database view representation of the first table are determined to be one of the determined first non-null value for the first column of the database view representation of the result of the UNION ALL query operation and the determined first non-null value for the second column of the database view representation of the result of the UNION ALL query operation, based on the value of the third column as determined by the SUM operation.

* * * * *